United States Patent Office 3,560,054
Patented Feb. 2, 1971

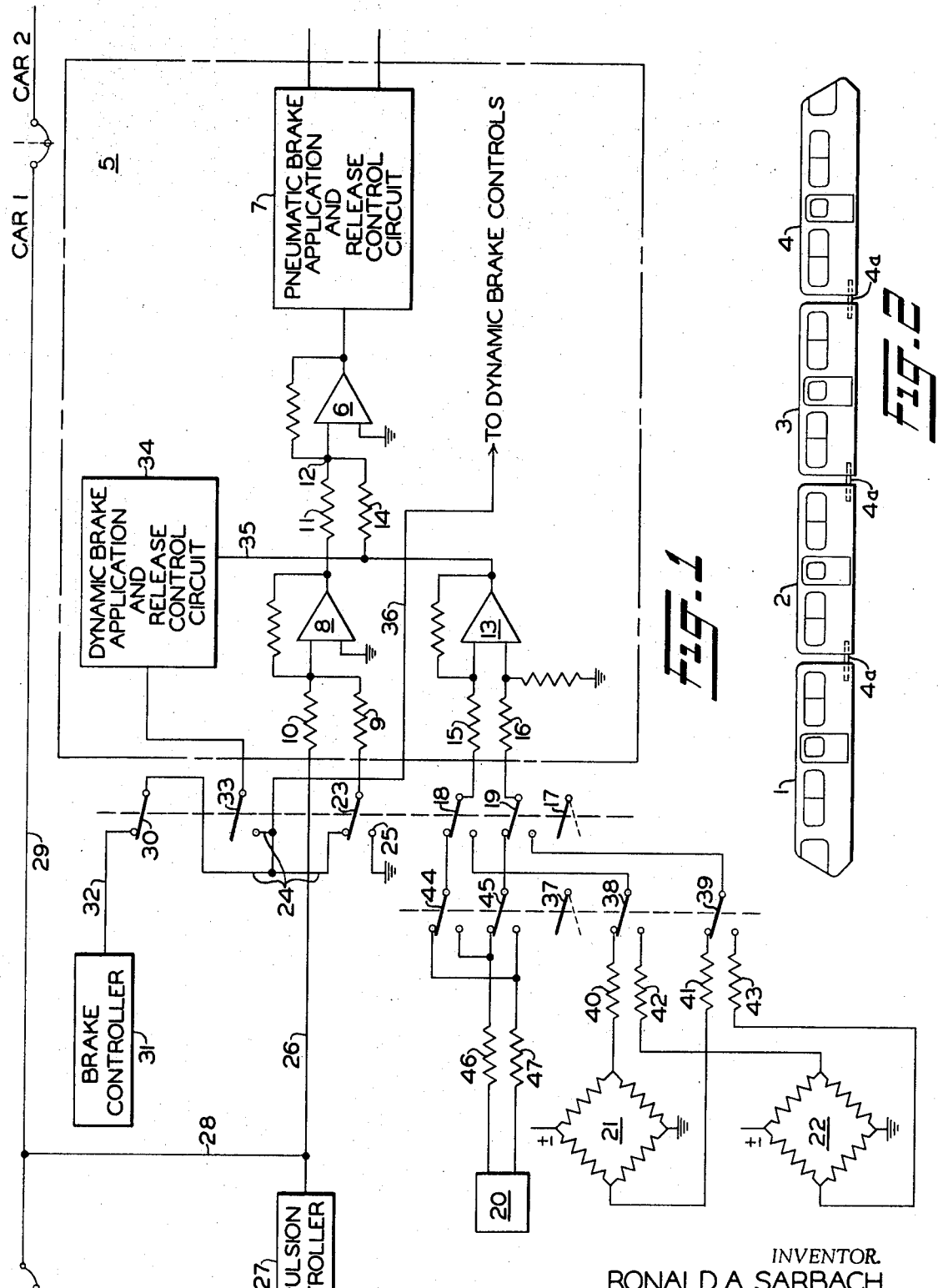

3,560,054
BRAKE CONTROL SYSTEM FOR RAILROAD TRAINS
Ronald A. Sarbach, Columbus, Ohio, assignor to Westinghouse Air Brake Company, Wilmerding, Pa., a corporation of Pennsylvania
Filed Apr. 22, 1969, Ser. No. 818,334
Int. Cl. B60t 13/68
U.S. Cl. 303—20          13 Claims

ABSTRACT OF THE DISCLOSURE

An electronic brake control system for railway trains in which strain sensors monitor buff and draft coupler forces existing between adjacent cars in the train consist to establish a brake control signal at the trailing one of the cars. The analog polarity signal produced in accordance with the degree and character of coupler strain establishes control of the vehicle brakes, the effectiveness of which control is varied by a consequent change in coupler force as the vehicle brake controls attempt to arrive at a condition of brake effort where coupler forces are balanced. The head-end car in the train consist establishes the reference rate of retardation on the consist to which the trailing car brake controls adhere. Rate feedback means on the head-end car constrains its brake controls to maintain a linear and repeatable retardation rate in accordance with the level of brake request signal. Blending of friction and dynamic brake control is obtained on the head-end car with other variable dynamic conditions effective on each trailing car being inherently reflected through the brake control signal produced by coupler strain whereby each car in the train shares the braking responsibility in accordance with the dynamic characteristics peculiar to that particular car.

BACKGROUND OF INVENTION

With the advent of high speed rail transit systems where transit cars or trains are operated at closely controlled intervals and at increasingly faster speeds in order to transport large masses of people, an increasingly greater demand is imposed upon the vehicle braking systems. These systems must be adaptable to either automatic or manual control to effectively bring the vehicle to a safe halt in the shortest practical distance, within closely defined limits, with a high degree of repeatability and without causing passenger discomfort.

Evolution of braking advancements has produced such open loop brake control concepts as stepped speed governor control and continuous speed taper control as well as the more recently introduced closed loop systems. Exemplary systems employing the latter concept sense either retarding force by monitoring torque forces on the brake rigging components or brake force by monitoring fluid pressure effective at the brake cylinders, converting these forces into analog electrical signals which are utilized in the feedback loop. When further compensated by load weighing and dynamic-friction brake blending, it is attempted to provide a brake control system which constrains the vehicle retardation rate to be a linear and repeatable function of the brake level requested despite inconsistencies in car weights, brake shoe to wheel friction, dynamic brake effectiveness and other variances. Difficulty in obtaining a true retarding force signal without deviations and the fact that brake force itself does not give an accurate means of sensing vehicle retardation rates, even when supplemented with such auxiliary feedback loops as mentioned above, precludes attainment of a truly sophisticated system.

Whereas, the closed loop systems cited above are, in essence, compensatory for such variables as influence retardation rates, pure rate feedback is fundamental, being derived directly from the retardation rate effective on the vehicle irrespective of conditions affecting the retardation rate. As opposed to systems employing the brake or retarding force concepts as a means of sensing the retardation rate of a vehicle therefor, pure rate sensing, as by a car-carried accelerometer, has been proposed as possessing the capability of controlling braking performance most consistent with meeting present and projected brake control requirements, especially where the brake system is to be under automatic control.

However, in multi-car consists where each car is provided with an accelerometer as a means of sensing the vehicle rate of retardation, thereby regulating its brake control, severe stability problems have been found to occur.

Because of the varying dynamic factors influencing each individual car, it is difficult to attain a desired level of retardation on the train with each car producing brake effort consistent with its own particular dynamic conditions independently of the other cars. Even though the retardation rate of the train may adhere to the rate requested, as evidenced by the accelerometer feedback signal, there is no assurance that the rate obtained is not arising from a relatively heavy brake response on one or more cars with little or no braking effort on the other cars. Once the slack has run in during a slow down or stop, the train consist becomes essentially a solid unit which exhibits the same rate of retardation throughout its entire length. Thus, if any particular car or cars in the train consist are capable of braking the train at the requested rate, a mismatch between any of the cars' brake controls, with respect to response times or force magnitudes disproportionate to the vehicle load condition, may result in a shift of brake effort to said car or cars. This mismatch between the brake controls of different cars not only results in excessive wear on these particular cars' brake system components but, where the rate of retardation requested exceeds the rate capable of being provided by said car or cars, results in a condition in which the effective brake effort could conceivably increase until the wheels become locked and slide. At this occurrence, the other cars' brakes would increase in effectiveness in an attempt to provide the additional brake effort necessary to satisfy the requested retardation rate. This condition obviously is made even more severe where adverse wheel-rail adhesion exists and, in addition to being the cause of slid flat wheels, results in extremely rough train action.

It is the principal object of the invention therefore to provide an electronic brake control system for a multi-car consist which employs a closed loop rate feedback signal by which means brake control is regulated to correlate the retardation rate and brake request without the attendant disadvantages cited above and which lends itself to simplification of the electronic brake control unit.

It is a further object of the invention to provide an electronic brake control system suitable for multi-car rapid transit service in which only the lead car brake control is regulated by rate feedback to establish the rate of retardation to be adhered to by all cars of the consist with each trailing car receiving a self-imposed brake request signal predicated on the relative inertia of adjoining cars by sensing the buff or draft forces on the trailing car couplers, thus assuring that the brake effort resulting in the retardation rate requested is shared proportionately consistent with the variable conditions affecting each car.

SUMMARY OF INVENTION

By way of a brief summary of the invention, an electronic brake control system is provided in which strain sensors monitor buff and draft forces effective at the couplers between adjacent cars in a multi-car railway consist to thereby establish a brake control signal at the trailing one of the cars, with the head-end car establishing a reference rate of retardation on the consist. Any variance in the car's dynamic characteristics is reflected in the coupler strain signal so that each car produces brake effort accordingly, while the train speed is regulated in accordance with the brake request signal effective on the head car.

On the head-end car of the consist, an electronic brake control unit is provided in which an analog brake request signal produced by automatic or manual control means is effective at a first input terminal for comparison with an accelerometer produced feedback signal effective at a second input terminal corresponding to the effective rate of retardation of the consist. A pneumatic brake control means is responsive to the error signal thus produced to effect control of friction brake effort while a dynamic brake control means is directly responsive to the level of the brake request signal to produce dynamic brake effort. The combined friction-dynamic brake effort is regulated in a closed loop mode such that friction-dynamic brake blending is obtained, the total brake effort being a linear and repeatable function of the brake request signal.

On trailing cars in the consist, an electronic brake control unit is provided in which a reference signal is effective at the first input terminal for comparison with the coupler strain signal effective at the second input terminal. In this manner, a brake control signal is produced in accordance with the difference in signal levels whereby control of the friction and dynamic brakes is varied in response to the change in strain signal. Since coupler forces are altered by the brake control imposed and the strain signal which determines the brake control is a function of the coupler forces, it will be seen that both dynamic and friction brake control is produced in a closed loop mode, with both the brake control signal and feedback of the effective brake effort being implied by the coupler strain signal. The effective brake effort is maintained at the level where coupler forces are in balance whereby each car establishes its own level of retardation effort consistent with the dynamic characteristics effective and the level of retardation called for by the lead car brake controls.

A selector switch on each car sets up the electronic brake control unit for the mode of service in which the cars will operate, i.e., lead or trail. A direction switch is provided to assure that the proper accelerometer polarity on the lead car is chosen and that the forward facing coupler sensing element is activated in accordance with the heading of the trailing car or cars.

Objects and attendant advantages of the present invention will become apparent from a consideration of the following detailed description of a preferred embodiment thereof, especially when studied in conjunction with the accompanying drawings in which:

FIG. 1 is a representation of a multi-car rapid transit type train consist wherein strain sensing elements are employed with each car coupler, and FIG. 2 is a view, showing diagrammatically the car brake system components comprising the present invention.

DESCRIPTION

Referring now to the drawings, FIG. 1 shows several cars 1, 2, 3 and 4 of a multi-car consist coupled together in the usual manner by transit type car couplers 4a. It is not worthy of mention at this time that a tightlock style coupling, that is, one in which no cushioning or slack exists either in the physical coupling or draft gear, is a necessary accompaniment of the invention for reasons as will hereinafter be obvious. Each of the above-mentioned cars 1, 2, 3 and 4 is equipped with an electronic type brake control unit 5 having an operational amplifier 6 which produces polarity inversion and signal amplification of an error input signal that varies between positive and negative polarities. The output signal of amplifier 6 drives a polarity responsive pneumatic brake application and release control circuit 7 in such a fashion that polarity responsive electro-pneumatic valves (not shown) are operated in accordance with which polarity responsive circuit is triggered by its input signal to control the friction brake effort through pneumatic tread brake units. Within a range of approximately ½ volt above and below zero potential at the output of amplifier 6, lap condition of the electro-pneumatic valves is obtained so that the brake pressure may be maintained at a desired level without overshooting and thus causing oscillation of the brake control. A positive output signal greater than approximately +½ volt represents a call for brake application while a negative going signal greater than approximately —½ volt indicates a call for brake release. A more comprehensive understanding of the application and release driver circuits may be obtained from a description thereof in copending application of Robert D. Smith and Ronald A. Sarbach, entitled "Electrically Controlled Fluid Braking System for Rapid Transit Cars," bearing Ser. No. 656,929, filed July 28, 1967, where it is illustrated and described in such detail that no further description is believed necessary in the present application.

Also included in the electronic operating unit 5 is an operational amplifier 8 to which is fed an analog signal via resistor 9 or a digital signal via resistor 10. The output signal of amplifier 8 is connected via a rate control resistor 11 to a summing point 12 where the effective signal level is compared to the output signal of an operational amplifier 13 connected thereto via resistor 14. The error signal for driving amplifier 6 and establishing the necessary brake control is derived at summing point 12 by algebraically adding the signals from the outputs of amplifiers 8 and 13 via resistors 11 and 14, respectively. Amplifier 13 operates in a differential mode, providing amplification and polarity inversion of a differential analog signal at its input terminals via resistors 15 and 16.

As will hereinafter be more fully explained, the signal delivered to the input of amplifier 13 is intended to be representative of a retardation rate when the electronic control unit 5 is associated with a lead car and is representative of a strain produced in a car's coupler when unit 5 is associated with a trailing car in the train consist. Also, the input signal at amplifier 8 is intended, in lead mode of service, to be representative of an analog brake request produced either by automatic equipment or by manual control means; in trail service, the brake request is replaced by a digital signal dependent upon brake or propulsion mode of control. It will therefore be seen that where the type of train service requires that the cars be universal, i.e., capable of being deployed in a train consist as either a lead or trailing unit, means must be provided on each car to connect the appropriate brake control signals to the proper inputs of the system components in accordance with the intended mode of service, lead or trail as the case may be.

Available on each car is a manual or automatically actuated selector switch 17, which is adapted to set up the brake control unit 5 for either lead or trail service. Contact arms 18 and 19 connect the input terminals of amplifier 13 to the output signal of a rate sensor 20, such as, for example, an accelerometer, when switch 17 is moved to its upper position shown in solid lines. The rate sensor 20 is capable of producing a differential signal corresponding to the effective vehicle rate of retardation, being direction sensitive as implied by the polarity of the signal. A strain sensing element 21 or 22, such as, for example, a balanced resistance arm bridge network, is connected to the input terminals of amplifier 13 by contact arms 18 and 19 when switch 17 is placed in its lower position shown in broken lines. Strain sensors 21, 22 are suitably applied to the couplers at opposite ends of each car so as to reflect the degree of strain imposed on a car's coupler by producing a differential signal analog of the degree of strain. The differential signal analog produced also represents the type of strain on the coupler (tension or compression) by the polarity of the signal, being 0 volts when the sensor resistance arms are balanced by the absence of any coupler strain. In addition to establishing which signal source is connected to the input of amplifier 13, switch 17 includes a contact arm 23 for controlling which one of two signal sources is connected to the input of amplifier 8. With switch 17 in its upper position in which the control unit 5 is set up for lead service, a brake control wire 24 feeds an analog brake request signal to the input of amplifier 8. In trail service with switch 17 in its lower position, contact arm 23 engages a grounded contact 25 to complete a circuit in which the input of amplifier 8 is cut-off from wire 24 and is connected to a release wire 26 over which a digital signal produced by a propulsion controller 27 is sent, depending upon whether or not the controller is calling for propulsion. A branch wire 28 is connected to a train-line wire 29 to transmit the digital signal from the propulsion controller 27 to the brake control unit 5 on each car for a purpose hereinafter explained. A contact arm 30 connects a manual brake controller 31 to brake control wire 24 via wire 32 in the upper position of switch 17 and a contact arm 33 connects a dynamic brake application and release control circuit 34 to control wire 24 in the lower position of switch 17. The output signal of amplifier 13 is connected via wire 35 to the input of circuit 34 where it is conditioned, as will hereinafter be explained, to control the dynamic brakes in a manner similar to control of the pneumatic brakes. Wire 36 transmits the brake control signal from wire 24 to the dynamic brake controls via contact arm 30 in lead service and via contact arm 33 in trail service.

A direction sensitive switch 37 controls contact arms 38 and 39 so as to activate whichever strain sensor 21 or 22 is associated with the coupler facing the forward end of the train so that only the strain on the forward facing coupler of each car is monitored. Although it is feasible to utilize a signal derived from the difference between the coupler forces effective on both the front and rear of a car for the purpose of controlling the brakes on trailing cars, the former case is believed, for stability reasons to be the more practical and is therefore only discussed herein. As shown in the drawing, strain sensor 21 is connected from the juncture of each voltage divider arm of the resistance bridge via control resistors 40, 41 and contact arms 38, 39 to the open contacts associated with contact arms 18, 19 of switch 17. In the lower position of switch 37, strain sensor 22 is connected by control resistors 42, 43 and contact arms 38, 39 to the same open contacts of switch 17. Moving switch 17 to its lower position connects whichever strain gage 21 or 22 is selected by switch 37 to the input terminals of amplifier 13. Contact arms 44, 45, also controlled by switch 37, serve to assure the proper polarity at the input terminals of amplifier 13 when the accelerometer 20 is connected thereto in lead service irrespective of the direction in which the car is headed in the train. The direction sensitive output polarity of the accelerometer necessitates this polarity inversion according to the direction the car is headed in the train. Regardless of the car heading, contact arms 44 and 45 connect the output terminals of the accelerometer such that the differential signal is transmitted via control resistors 46 and 47 so as to always correspond in polarity to the direction the train is traveling.

With regard to contact arms 30 and 33, either the brake controller signal or strain sensor signal is made effective to establish the brake control signal via wire 32 or wire 36 in accordance with lead or trail service respectively.

The dynamic brake application and release control circuit 34 is provided to condition the dynamic brake control signal on trailing units in response to the strain signal produced by sensors 21 or 22. Since the level of brake request on trailing cars varies with the degree of strain imposed on its coupler, control circuit 34 is employed to provide a brake control signal the level of which varies in accordance with an exponential function for control of the dynamic brake. That is, the level of the brake control signal is determined by the duration the strain sensors supply a given polarity signal irrespective of the magnitude of the signal level.

The configuration of a circuit of this type could be resolved in several ways, one of which might include application and release relays which provide a function similar to what is described in U.S. Pat. No. 3,398,815 as A & R mode wherein an alternate choice to the P-wire means of providing a brake request signal is obtained. The application and release relays, however, must be polarity responsive in the present application wherein a control capacitor is charged via a rate limiting resistor to a voltage level determined by the duration and application polarity sensitive relay is activated. When the strain sensor signal is essentially 0 volts, plus or minus some predetermined tolerance, the application relay will drop out, at which level the specific charge on the capacitor is held. The dynamic brake control will therefore see a specific brake request signal until the output polarity of strain sensors 21 or 22 is reversed. This will cause the release polarity sensitive relay to respond by connecting the control capacitor to ground, thereby dissipating its charge and removing the brake request signal. The dynamic brake controls will respond by releasing the dynamic brake effort. Brief mention is made of this dynamic brake control from the strain sensor signal as an aid in understanding how the dynamic brake effort is developed similar to development of the pneumatic brake pressure; however, further detailed description of such a circuit is not believed necessary and therefore not undertaken.

OPERATION

In the operation of a multi-car train having the above-described equipment carried on each car of the consist, it is first necessary to set up the control equipment for lead or trail service depending upon location of the car in the consist. On the lead car, for example, selector switch 17 is moved to its upper position as shown in solid lines in which the brake control signal effective at wire 24 is connected to the input terminal of amplifier 8 via contact arm 23 and resistor 9 and by way of wire 36 to the dynamic brake controls. Movement of selector switch 17 to lead position also establishes the rate sensor 20 as the differential signal source effective across the input terminals of amplifier 13 by way of resistors 46, 47, whichever contacts are closed by contact arms 44, 45 of direction switch 37, contact arms 18, 19 and resistors 15, 16.

The level of the brake request signal at the input of amplifier 8 is determined by the signal level in control wire 32 established by manual operation of brake controller 31, as shown, or by automatic means or by radio control means, neither of the latter means being shown. In braking mode, the analog brake request signal connected to wire 24 via wire 32 and contact arm 30 varies between zero volts corresponding to full brake release and some positive voltage level consistent with maximum brake call. This signal is inverted and amplified by amplifier 8, the negative output thereof being supplied via rate control resistor 11 to the summing point 12 of summing amplifier 6. By assuming that no retardation is effective on the train, it can be concluded that the rate sensor 20 is producing a zero volt differential signal across the input terminals of amplifier 13. After signal inversion and amplification by amplifier 13, the zero volt signal is simply transferred via wire 35 and resistor 14 to summing point 12 and to the signal generator circuit 34 which is inactive due to the open contact arm 33 of switch 17 in lead position. By algebraically adding the signals at summing point 12, some negative level corresponding to the degree of brake call drives amplifier 6 which, by inversion and amplification, produces a signal level of positive polarity at its output. Application and release control circuit 7 responds to this positive polarity, producing signals which control application and release electro-pneumatic valves (not shown). Fluid under pressure is accordingly supplied to the power cylinders of tread brake units on the car, resulting in a pneumatic brake application by movement of the brake shoes against the vehicle wheels. Since a dynamic brake is typically slow to respond, the initial retardation effort is realized by the continual supply of pneumatic pressure until the rate of retardation is consistent with the magnitude of the brake request signal as determined by the error signal at summing point 12.

The rate of retardation of the train consist is monitored continuously by accelerometer rate sensor 20 on the lead unit which produces a feedback signal to the input of amplifier 13 that varies between zero volts and some negative value as the rate of retardation increases. After the signal is conditioned by amplifier 13 and resistor 14, it is compared to the brake request signal at summing point 12 where an error signal derived is modulated in accordance with the increasing rate of retardation. Since pneumatic braking has traditionally been capable of providing the maximum brake effort required, it is reasonable to expect that the friction brake effort will account for the total brake effort effective on the car consistent with the level of brake request. When the brake request is satisfied by reason of the feedback signal matching the brake request signal at summing point 12, lap condition of the brakes is called for wherein the pneumatic pressure effective at the brake units is bottled up at the level necessary to produce the desired retardation rate. Any subsequent unbalance at the summing point toward negative polarity, for example, due to the retardation rate dropping off or the brake demand increasing, will result in an increase in brake pressure in an attempt to correlate the brake request and retardation rate. Should a relaxation in the brake request or an increase in the retardation rate occur, such as, for example, by the dynamic brakes finally becoming effective, a positive error signal at the summing point will drive amplifier 6 to call for a brake release through the pneumatic brake application and release control circuit 7 whereby the friction brake effort will become increasingly relaxed until the error signal again becomes essentially zero volts. A lap range within approximately ½ volt positive and ½ volt negative levels is provided to reduce the occasion of overshooting and oscillating of the brake control. It will, therefore, be seen that as the dynamic brake becomes increasingly effective, its retardation effort is monitored through the rate feedback signal which is compared to the brake request at summing point 12 to increasingly modulate the friction brake effort in accordance with dynamic brake effectiveness. In this manner, full friction-dynamic brake blending is provided and a constant level of retardation conforming to the brake request is obtained with rate control resistor 11 establishing the maximum permissible retardation rate corresponding to a preselected limit considered both safe and conducive to the comfort of the passengers. It will now be obvious that the lead car brake control system compensates for such inconsistencies as dynamic brake response and stability, vehicle load conditions, wheel-rail adhesion and the effective co-efficient of friction between the wheels and brake shoes without any auxiliary feedback loops, all of which are effective through the accelerometer rate feedback signal.

On each trailing car in the train consist, such as cars 2, 3 and 4 in FIG. 1, the selector switch 17 is moved downward to trial position in which the differential signal across either strain sensor 21 or 22, depending upon the position of direction switch 37, is connected to the input terminals of amplifier 13. Also in this position of the selector switch, contact arm 23 cuts off control wire 24 from the input terminals of amplifier 8 and instead completes a circuit to ground in which digital signal wire 26 is connected to the input terminal of amplifier 8. In addition, contact arm 30 interrupts signal communication between the brake controller 31 and the dynamic brake controls via control wire 24 and wire 36. Conversely, contact arm 33 engages its contact to establish signal communication at the dynamic brake controls by way of the dynamic brake control circuit 34 and wire 36.

Assuming direction switch 37 on car 2 is in its upper position as shown, strain sensor 21 on the leftward or head-end facing coupler is connected to the input terminals of amplifier 13 via resistors 40, 41, contact arms 38, 39 of switch 37, contact arms 18, 19 of switch 17 and resistors 15, 16. Assuming also that the lead car has made a brake application resulting in retardation effort thereon, as above explained, it will be seen that trailing car 2 is pushed into car 1 by the momentum of trailing cars 3 and 4 as well as by its own inertia, resulting in a buff, that is compressive, force on the front coupler of car 2. The configuration of strain sensors 21 and 22 is such that a compressive force on the car coupler produces an electric signal which varies between zero and some positive voltage level while a draft, that is pull-apart, force at the coupler results in a signal between zero and some negative voltage level. Therefore, as car 2 pushes into car 1 which is attempting to brake the train consist at a rate requested by control means associated therewith, a positive differential signal is produced across the input terminals of amplifier 13. The magnitude of this signal corresponds to the degree of compressive force on the coupler of car 2, thus indicating the disparity between the effective inertia of cars 1 and 2. Amplifier 13 receives the strain signal, inverts and amplifies its signal to a negative polarity which is transmitted as a brake request signal via wire 35 to the dynamic brake control circuit 34 and to summing point 12 via resistor 14.

At the summing point, the brake request, signal is compared to the digital output signal from amplifier 8 which, during braking or coasting, is maintained at zero potential. Only when propulsion is called for does propulsion controller 27 produce a discrete signal level over digital wire 26 for a purpose hereinafter explained. The negative error signal derived at the summing point drives amplifier 6 to a positive output polarity which triggers the pneumatic brake application and release control circuit 7 to call for supply of fluid pressure to the brake units via electro-pneumatic application and release valves as hereinbefore explained. As long as the output signal of summer amplifier 6 remains above approximately ½ volt positive polarity, the polarity responsive control circuit 7 will continue to call for fluid pressure supply to the brake units.

At the same time, the negative output signal from amplifier 13 at the input of the dynamic brake application and release control circuit 34 results in the charging of a control capacitor thereof to a level determined by the duration the negative signal remains on wire 35 as previously explained. Since the contact arm 33 is engaged on its contact at this time, the charge on the capacitor is transmitted to the dynamic brake controls to establish the level of dynamic brake request. Both the friction and dynamic brake effort continue to develop in parallel as long as the output signal of the strain sensor 21 is indicating a compressive force on the forward facing coupler of car 2.

When the individually established retardation effort on cars 1 and 2 is such that essentially all coupler force is absent, strain sensor 21 will produce a zero voltage signal indicating that the resistance bridge network of sensor 21 is balanced. This results in a zero voltage signal at summing point 12 and at the input of the dynamic brake control circuit 34 calling for lap condition of both the pneumatic and dynamic brake controls whereby the level of retardation effort is held constant.

At this point, any change in the dynamic conditions such as track grade or change in retardation effort will result in a corresponding strain sensor signal due to consequent coupler compression or pull-apart forces. With respect to this change in coupler force, a strain sensor output signal above approximately ½ volt positive polarity will activate both the friction and dynamic brake controls to develop a higher level of retardation effort, as above explained, in an attempt to bring the coupler forces into balance at which point the brake controls are restored to a lap condition.

Where the change in dynamic conditions of the car are such that the effective retardation effort becomes excessive, causing pull-apart forces at the coupler, strain sensor 21 will respond by producing a negative output which is converted by amplifier 13 and transmitted as a positive signal to summing point 12 and to the input of dynamic brake control circuit 34. This signal is conditioned by amplifier 6 whereby a negative polarity of approximately ½ volt at its output calls for release of the friction brake effort until the error signal at summing point 12 becomes essentially zero, at which time the brake control is lapped. Similarly, the dynamic brake effort is reduced to control circuit 34 responding to the positive polarity at its input by discharging its control capacitor until the level of charge corresponding to the level of dynamic brake call is maintained constant at a particular level when the strain sensor calls for lap condition.

Similarly, each successive trailing car controls its brakes according to the instantaneous coupler forces existing between adjacent cars whereby the rate of retardation established by the lead car is conformed within a fast yet smooth transition of brake effort from the front to the rear of the consist. It will therefore be seen that the system constantly strives to arrive at a condition where forces on the couplers between adjacent cars are absent indicating appropriate brake effort on each car in accordance with the retardation profile established by the lead car; also, the trailing car brake controls, like the lead car's controls, are constrained to produce a constant rate of retardation corresponding to a particular level of brake request. Since this brake request on trailing cars arises from coupler forces as monitored by a strain sensor, the level of brake request on each trailing car arises from its instantaneous rate of retardation with respect to the rate effective on the preceding car whereby serial, self-imposed brake control is obtained without the necessity of trainlining a brake control wire to transmit the signal. This alone results in substantial savings especially where additional circuitry such as where a P-wire generator circuit is normally employed to assure transmission of the control signal through the train without any degradation of the signal. Furthermore, the lead car establishes the retardation rate which by nature of the system cannot be exceeded by the trailing cars. Since the lead car establishes the reference rate by a true rate sensing feedback arrangement, it will be seen that the rate of retardation on the train is established in accordance with the reference rate called for at the lead car but with each car sharing proportionately in providing the brake effort in accordance with dynamic conditions peculiar to each particular car through serial, self-imposed brake control.

At long as the retardation rate requested is complied with, as above explained, it is reasonable to expect a pneumatic brake application to be in effect on all cars after being braked to a stop due to their brakes being lapped. On the lead car, the brake application may be released by movement of the brake controller handle to release position; however, on trailing cars contact arm 23 in trail position of switch 17 completes a circuit in which a negative signal is produced when the propulsion controller 27 is operated to start the train moving. Amplifier 8 inverts and amplifies this signal such that a positive signal is fed via resistor 11 to summing point 12 having sufficient magnitude to assure that any negative signal at the summing point is overcome, thereby driving the summing amplifier to call for a release of the friction brake. Branch wire 28 from release wire 26 and trainline wire 29 transmit the signal to each trailing car for release of its brakes in the same manner. Thus, all brake effort on the train will be be released, allowing the train to begin movement without attempting to release its brakes by reason of a pull-apart force on the cars' couplers causing a strain sensor signal to call for the brake release as would otherwise occur without the release function provided.

Although the above-described operation of the brake control system of the present invention is covered with respect to interchangeability between all cars, thereby requiring redundant system components to accommodate both lead and trailing car functions, with necessary switch means to set up the particular car conrtol system for its intended service, it should be evident that the complexity of the system can be vastly simplified where the cars are permanently positioned in the train. In this respect, the lead car equipment would include the electronic brake control unit 5 with a propulsion controller 27 and brake controller 33 in addition to an accelerometer 20. Trailing car equipment would include only the electronic brake control unit 5 and a single strain sensor associated with the forward facing coupler. By employing the identical control unit 5 on both lead and trailing cars, switching means to set up the dynamic brake control circuit 34 for either lead or trail service would still be required; however, by constructing the electronic control unit 5 for the appropriate service by including the dynamic brake control circuit 34 on only those electronic control units intended for service on trailing cars, all switching requirements may be eliminated.

In either case, the system performance is improved by operation predicated on rate feedback on a lead car and strain sensing on trailing cars to obtain brake effort on each car in accordance with its own particular dynamic characteristics for retarding the train at a constant rate of retardation determined by the level of brake request. Furthermore, regulated control of vehicle braking is accomplished by a single feedback loop without such previously employed compensatory feedback circuits as load weighing, retarding force and dynamic brake effectiveness as required when attempting to regulate the vehicle retardation rate indirectly by sensing retardation effort. Additional simplification is gained by eliminating the requirement for a trainlined P-wire control signal. In addition the attendant advantages mentioned permit a cost reduction, greater compactness and space savings, lighter weight and greater reliability to be realized as well as improved performance.

It is axiomatic that wheel slip protection is necessary to assure adequate performance under all wheel-rail adhesion conditions.

Having now described the invention, what I claim as new and desire to secure by Letters Patents, is:

1. A brake control system for a railway consist having a lead car and one or more trail cars thereof, said system comprising the combination of:
   (a) brake control means on the lead car for controlling a brake application thereon in accordance with a brake request signal,
   (b) retardation sensing means providing a feedback signal on said lead car for regulating the degree of brake application to cause a substantially uniform selected rate of retardation in correspondence with the brake request signal, wherein the improvement comprises:
     (i) strain sensing means associated with the couplers connecting successive cars in the consist for establishing a brake control signal responsive to buff and draft forces on the couplers, and (ii) brake control means on each trail car subject to the brake control signal established by a corresponding one of said strain sensing means for controlling a brake application thereon to regulate the braking effort in accordance with the character of coupler forces whereby each trail car of said consist is braked in accordance with the dynamic characteristics effective thereon.

2. A brake control system for a railway consist as set forth in claim 1 and further characterized in that each of the said brake control means on lead and trail cars has a first input terminal and a second input terminal and comprises a comparison circuit for comparing signal levels effective at said first and second input terminals whereby an error signal is derived.

3. A brake control system for a railway consist as set forth in claim 2 and further characterized in that said comparison circuit comprises:
(a) first amplifier means subject to an electrical signal at said first input terminal and producing a first output signal,
(b) second amplifier means subject to an electrical signal at said second input terminal and producing a second output signal, and
(c) electronic summing means responsive to said first and second output signals for producing said error signal in opposite polarities and at a voltage determined by the algebraic difference between said output signals.

4. A brake control system for a railway consist as set forth in claim 2 and further characterized by pneumatic brake control means responsive to said error signal, the effective polarity of which produces application or release of brake effort to a degree corresponding to the duration of said error signal.

5. A brake control system for a railway consist as set forth in claim 4 and further characterized in that said brake control means on said lead car comprises dynamic brake control means responsive to said brake request signal for controlling dynamic brake effort, the total pneumatic and dynamic brake effort effective being reflected in the feedback signal provided by said retardation sensing means whereby said pneumatic brake effort may be modulated in accordance with the effectiveness of said dynamic brake effort in respect of satisfying the brake request.

6. A brake control system for a railway consist as set forth in claim 4 and further characterized in that said brake control means on said trail cars comprises dynamic brake control means responsive to said brake control signal produced by said strain sensing means to control dynamic brake effort in parallel with control of said pneumatic brake effort, both pneumatic and dynamic brake effort being effective in accordance with one polarity of said control signal as determined by the character of coupler strain existing between adjoining cars of said consist and being relaxed in accordance with opposite polarities of said control signal, the combined pneumatic and dynamic brake effort being maintained at a certain level whenever said brake control signal becomes zero voltage in accordance with coupler forces being in a balanced condition.

7. A brake control system for a railway consist as set forth in claim 1 and further characterized in that switching means is provided having a first position in which a circuit is made connecting said brake request signal to said lead car brake control means and a second position in which a circuit is made to connect the brake control signal provided by said strain sensing means to said trail car brake control means.

8. A brake control system for a railway consist as set forth in claim 4 and further characterized by switching means for interrupting said brake request signal to and establishing a circuit via which a digital reference signal may be transmitted to said first input terminal on trail car brake control means.

9. A brake control system for a railway consist as set forth in claim 5 and further characterized by switching means for interrupting transmission of the brake control signal provided by said strain sensing means on a lead car to said dynamic brake control means and for establishing concurrently a circuit via which said brake request signal is transmitted to control dynamic brake effort.

10. A brake control system for a railway consist as set forth in claim 7 and further characterized in that said switching means in its said first position establishes a circuit via which said feedback signal provided by said retardation sensing means is transmitted to the second input terminal on lead car brake control means and in its said second position interrupts said circuit and establishes a different circuit via which said brake control signal provided by said strain sensing means is transmitted to the second input terminal on trail car brake control means.

11. A brake control system for a railway consist as set forth in claim 1 and further characterized by direction switch means for polarizing the feedback signal provided by said retardation sensing means according to direction of car travel.

12. A brake control system for a railway consist as set forth in claim 1 and further characterized by direction switch means on each car for selectively rendering the one or the other of the strain sensing means on couplers at opposite ends of a car effective to establish a brake control signal depending upon the direction of travel of the car.

13. A brake control system for a railway consist as set forth in claim 8 and further characterized in that means is provided wherein during braking mode of control, the voltage level of said digital reference signal is maintained at zero potential for comparison with the brake control signal provided by said strain sensing means, and wherein during propulsion mode of control, said reference signal is effective with polarity of such magnitude as to assure derivation of said error signal in the polarity opposite that produced in braking mode of control to enforce operation of the pneumatic brake control means to effect brake release.

References Cited

UNITED STATES PATENTS 3,384,032   5/1968   Ruff _____ 105—61
3,398,994   8/1968   Smith _____ 303—21(A4)

DUANE A. REGER, Primary Examiner

U.S. Cl. X.R.

105—61; 303—3